Aug. 6, 1957 T. M. WRIGHT 2,801,692
APPARATUS FOR THE SENSING AND REGISTRATION OF SHEETS
Filed Aug. 1, 1955 9 Sheets-Sheet 5

INVENTOR.
Theodore M. Wright
BY
*Morrish Rahtin*
ATTORNEY.

Aug. 6, 1957 T. M. WRIGHT 2,801,692
APPARATUS FOR THE SENSING AND REGISTRATION OF SHEETS
Filed Aug. 1, 1955 9 Sheets-Sheet 7

INVENTOR.
Theodore M. Wright
BY
ATTORNEY.

Fig. 13.

United States Patent Office 2,801,692
Patented Aug. 6, 1957

2,801,692

APPARATUS FOR THE SENSING AND REGISTRATION OF SHEETS

Theodore M. Wright, Camden, N. J., assignor to Radio Corporation of America, a corporation of Delaware Application August 1, 1955, Serial No. 525,534

9 Claims. (Cl. 164—48)

This invention relates to the feeding and indexing of sheet material for a machine operation, and more particularly to automatic apparatus for accurately positioning sheet material to be operated on by a machine such, for example, as a fabricating machine.

In the fabrication of printed circuits which may comprise, for example, a phenolic board having a thin copper facing on one side which has been etched to form a conductive circuit pattern, a very accurate guide means must be provided for positioning the board for such functions as the punching of holes and the insertion of components in the board. Such guide means may be the edges of the circuit boards or notches or index holes provided in the circuit board. The present invention relates to a feeding and indexing mechanism, for a shearing machine, to provide very accurate shearing of the circuit boards in relation to the circuit which is printed thereon. The indexing of the board is controlled by index marks which are printed on the board along with the circuit pattern and therefore bear a fixed relation to that pattern. While the feeding and indexing apparatus is described herein in conjunction with a shearing machine, it is apparent that the apparatus may have many applications.

An object of the present invention is to provide an improved apparatus for accurately positioning sheets in accordance with conductive index marks printed on the sheets.

Another object of this invention is to provide an improved automatic apparatus for accurately indexing a sheet in three planar dimensions and for feeding the indexed to a fabricating machine.

A further object of this invention is to provide an automatic feeding and indexing mechanism, adapted for use in the processing of printed circuit boards, which is rapid and efficient in use, which affords a maximum flexibility and ease of adjustment for handling different sizes of work, and which also affords a high degree of safety for the operator.

A still further object of this invention is to provide an automatic apparatus for making successive cuts in a sheet material, the apparatus providing for accurate indexing of the sheet prior to each cut and for advancing the sheet for the next cut.

A still further object of this invention is to provide an automatic apparatus for making successive cuts in a sheet material, the apparatus providing for accurate indexing of the sheet prior to each cut and for shutting down the apparatus when the indexing mechanism exceeds a limit.

A still further object of this invention is to provide an automatic shearing apparatus including means for accurately indexing a work prior to each cut, feeding the work to a shear, actuating the shear, advancing the work for a succeeding cut, and withdrawing the work from the shear for a succeeding indexing cycle.

In accordance with the present invention, an apparatus is provided for feeding a sheet material to a shearing machine and for accurately indexing the sheet with respect to the shear prior to the shearing operation. The sheet is provided with a plurality of conductive index marks which are accurately positioned with respect to printed patterns provided on the sheet. The machine comprises a plurality of slides, which are movable with respect to each other and with respect to the machine frame, to adjust the sheet linearly and rotationally in a single plane, to feed the sheet to the shear, and to advance the sheet for successive cuts. Separate control mechanisms are provided for sequentially positioning the sheet in the several dimensions. A plurality of contacts are provided in fixed relation to the shear for engagement with the index marks. One of the contacts is operatively connected to each of the control mechanisms, the mechanisms being controlled by the index marks. An overall operational circuit for the machine provides for positioning the sheet, advancing of the slide assembly to position the sheet for shearing, shearing the sheet, advancing the sheet, withdrawing the slide assembly to position the next set of index marks adjacent the contacts, and actuating the control mechanisms for again positioning the sheet for the next shear.

The novel features of this invention, as well as additional objects and advantages thereof, will be understood more fully from the following description when read in connection with the accompanying drawings, in which.

Referring now in more detail to the accompanying drawings, the present invention is embodied in an indexing apparatus for positioning a printed circuit board in a machine, such as a shearing machine, so that the board may be very accurately sheared along a line predetermined with respect to the circuit printed on the board.

Figure 3:
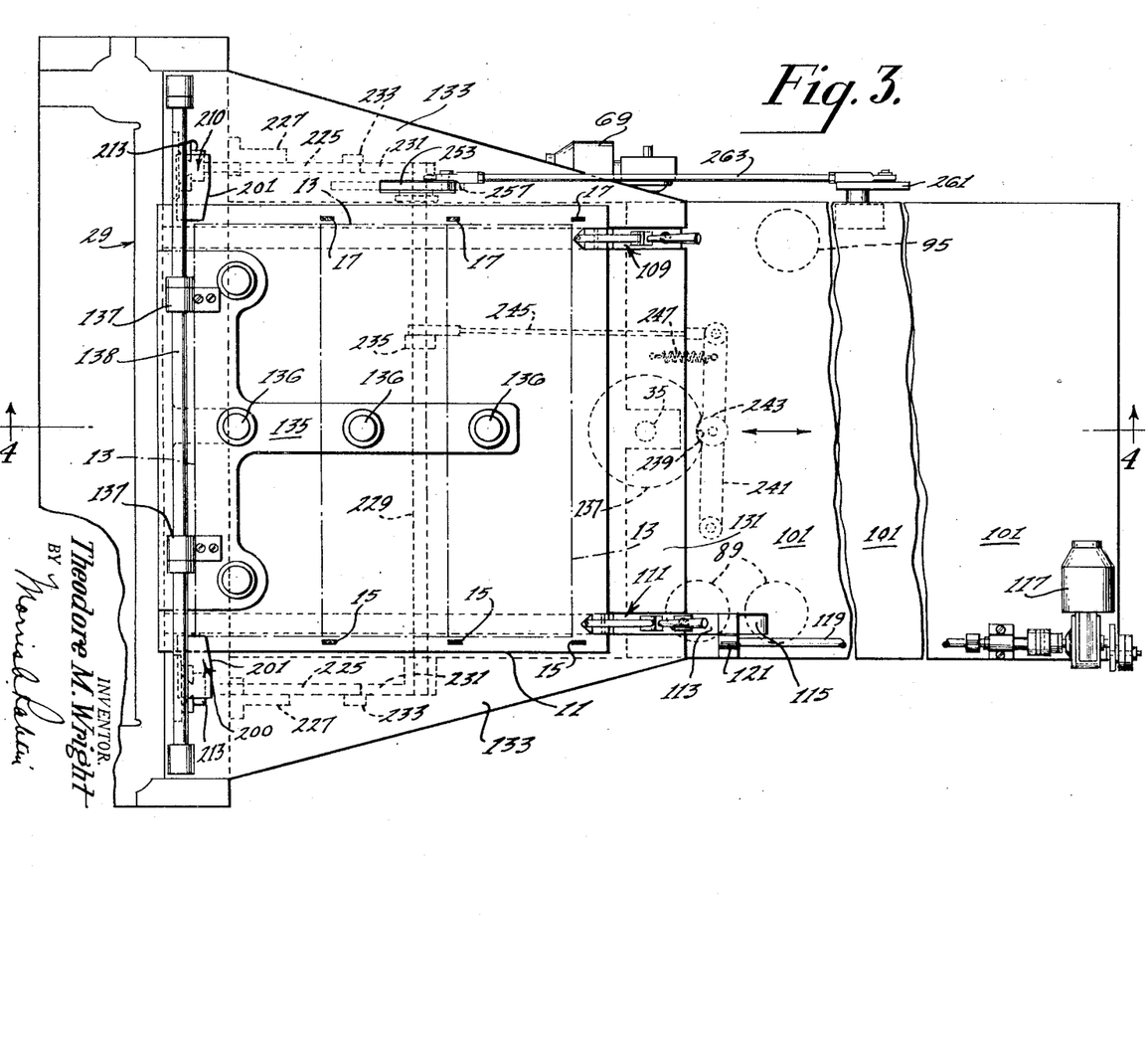
Figure 3 is a view in plan, partially broken away, of the machine of Figure 1 and includes a printed circuit board which is being positioned by the machine.
Figure 4:
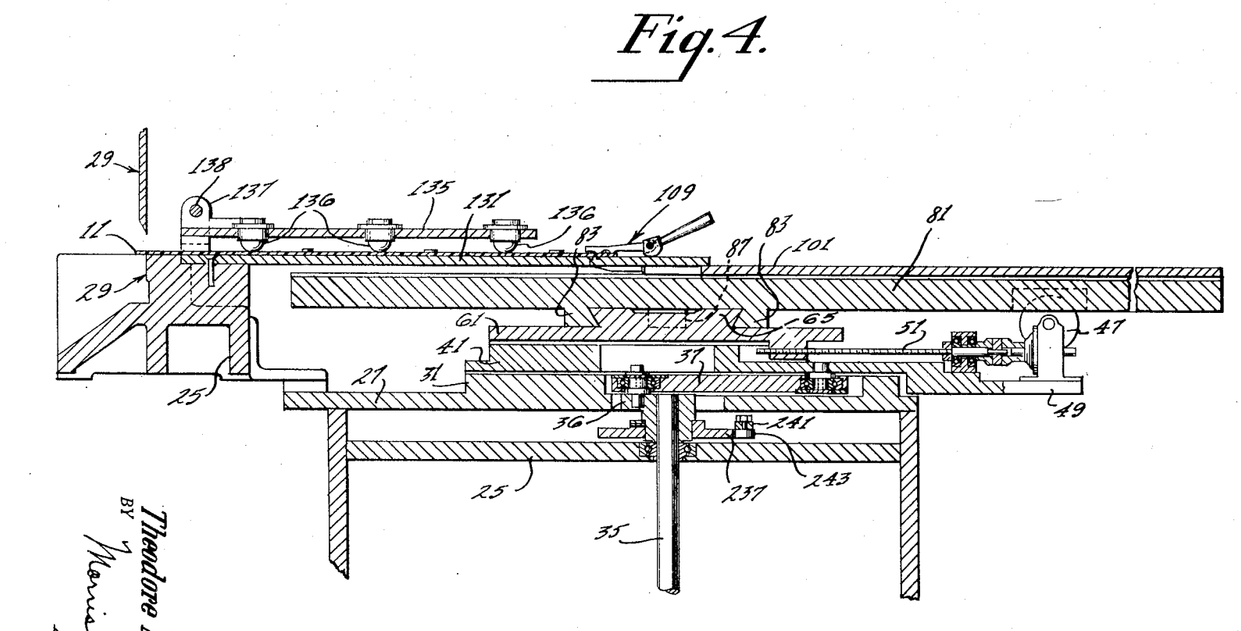
Figure 4 is a sectional view in side elevation taken along the line 4—4 of Figure 3 looking in the direction of the appended arrows.

Referring to Figure 3, a printed circuit board 11 is constructed of a copper clad phenolic board. The board is of a standard width and has circuits printed on it which are in the form of strips 13, of identical width, perpendicular to the longitudinal dimension of the board which is coincident with the direction of feed of the board. These circuit strips 13 are indicated in phantom outline. A pair of index code marks 15 and 17 are printed on the circuit board for each of the circuit strips and are positioned at each end of the circuit strip. These index code marks are very accurately dimensioned and are very accurately positioned with respect to the printed circuits as will be seen.

The apparatus for indexing the printed circuit board and for advancing the board to the shearing position includes a slide assembly which comprises a plurality of slides mounted one above the other, each slide being movable relative to its adjacent slide, and an operating circuit for controlling the slides.

Figure 1:
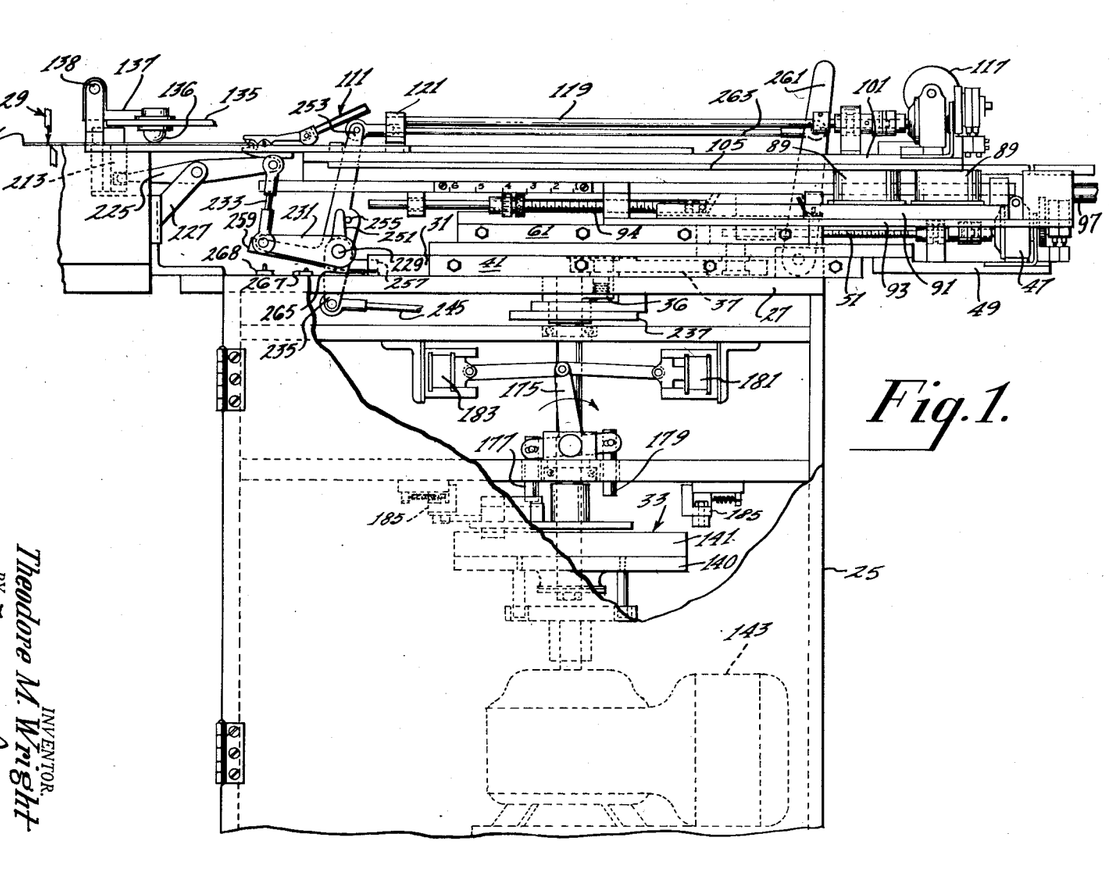
Figure 1 is a view in side elevation, partially broken away, of a machine in accordance with the present invention.
Figure 2:
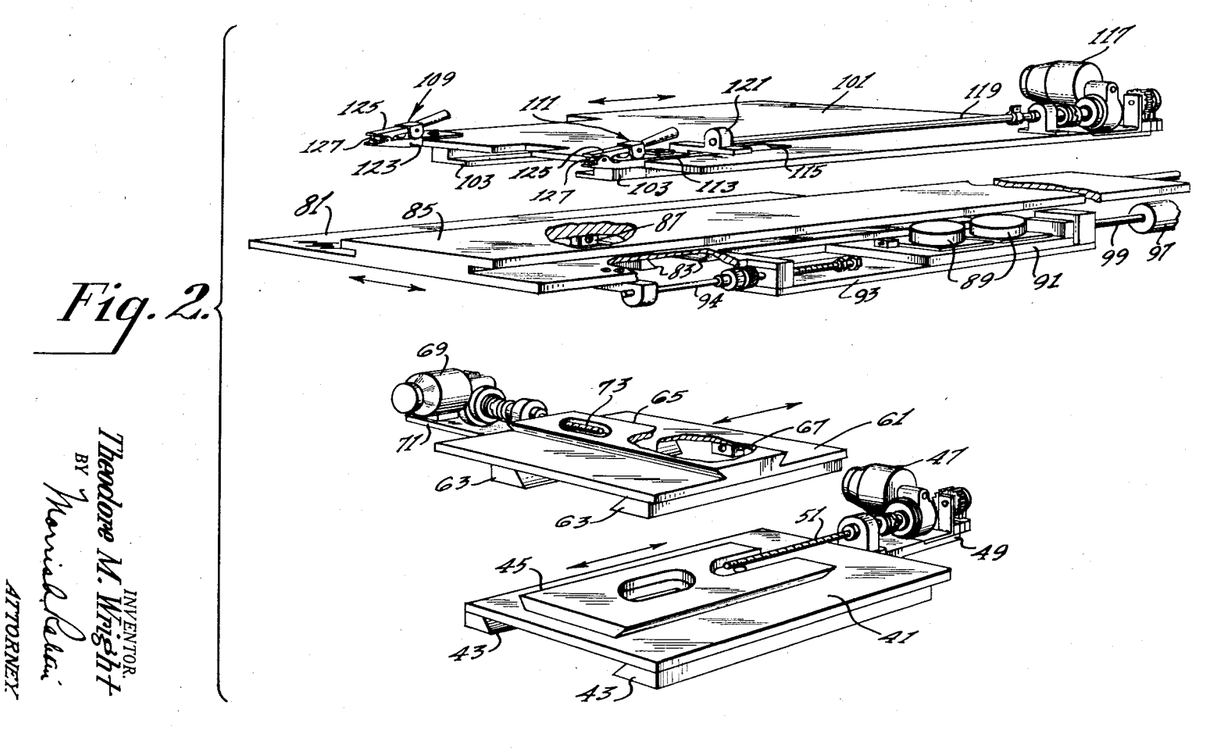
Figure 2 is an exploded perspective view of the several slides of the machine of Figure 1.

Referring now to Figure 1, the apparatus is supported on a frame 25 having an upper table portion 27. A shear mechanism 29 is mounted at one end of the table 27 and is shown at the upper left hand portion of Figure 1. The slide assembly is mounted on the table 27 adjacent the shear mechanism 29.

The longitudinal dimension of the apparatus is illustrated in Figure 1. In the following description of the apparatus, movements of the parts of the apparatus which are either toward or away from the shear are termed "longitudinal movements." Movements toward the shear are termed "forward movements" and movements away from the shear are termed "backward" or "rearward movements." Movements perpendicular to the longitudinal movements are termed "transverse movements." Similarly dimensions of the parts of the apparatus are termed "longitudinal" when they are parallel to the longitudinal dimension of the machine and "transverse" when they are perpendicular to the longitudinal dimension of the machine.

Since this invention is concerned primarily with an indexing and feeding system, the shear mechanism is only an incidental part of the apparatus and is indicated only as a suggested application for the indexing system. Since the shear mechanism is not an essential part of the present invention it will not be described in detail.

Slide assembly

Referring now to Figures 1 through 4, the table 27 is provided with a dovetailed rib 31 whcih extends in a longitudinal direction. A shuttle slide 41 is provided on its under surface with a pair of gibs 43 for engagement with the dovetailed rib 31 and is provided on its upper surface with a dovetailed rib 45 which is aligned parallel with the gibs 43.

The shuttle slide is provided for moving the entire slide assembly forward to position the circuit board in the shear mechanism, after an indexing cycle has been accomplished, and for returning the slide assembly to its original position so that a subsequent indexing cycle may be accomplished. In order to accomplish this motion of the shuttle slide, a clutch 33 is provided which rotates one half revolution each time it is engaged and locks itself against further rotation. The operation of this clutch will be described subsequently in further detail. The clutch 33 is mounted within the frame 25. An output shaft 35 of the clutch 33 extends upwardly to the table 27. A crank 36 is fixed to the upper end of the shaft and rotates within an aperture provided in the table 27. The crank 36 is coupled to the shuttle slide 41 by means of a crank arm 37. The crank arm 37 is pivotally engaged, at one end, with the crank 36 and, at the other end, with a pin which extends downwardly from the shuttle slide. The rotation of the crank 36 is stopped when the shuttle slide 41 is positioned at the extremes of its longitudinal movement.

A longitudinal slide 61 is provided, on its under surface, with a pair of gibs 63 for engagement with the dovetailed rib 45 of the shuttle slide, and is provided on its upper surface with a dovetailed rib 65 which is aligned perpendicular to the gibs 63. The longitudinal slide provides for fine adjustment of the printed circuit board in a longitudinal direction. The longitudinal slide 61 is driven with respect to the shuttle slide 41 by means of a motor 47 which is mounted on an extension 49 of the shuttle slide 41. The motor 47 is directly coupled to a screw 51 extending parallel to the dovetailed rib 45. A tapped block 67 extends downwardly from the under surface of the longitudinal slide 61 and is engaged by the screw 51 to provide the coupling between the longitudinal slide 61 and the shuttle slide 41.

A cross slide 81 is provided, on its under surface, with a pair of gibs 83 for engagement with the dovetailed rib 65, and is provided on its upper surface with a slide portion 85 which is parallel with the dovetailed ribs 31 and 45. The cross slide 81 provides for fine adjustment of the printed circuit board in a transverse direction. The cross slide is driven by means of a motor 69 which is mounted on an extension 71 of the longitudinal slide 61. The motor 69 is directly coupled to a screw 73 extending parallel to the dovetailed rib 65. A tapped block 87 extends downwardly from the under surface of the cross slide 81 for engagement with the screw 73 to provide the coupling between the cross slide 81 and the longitudinal slide 61.

A work slide 101 is provided on its under surface with a pair of gibs 103 for engagement with the slide portion 85. This slide 101 is provided for advancing the printed circuit board a fixed distance after each successive shear. Movement of the work slide 101 in relation to the cross slide 81 is provided by a pair of electromagnets 89 which are rigidly attached, adjacent each other, to a magnet slide 91. The magnet slide moves in a longitudinal direction parallel to the slide portion 85 and rides on a bearing plate 93 which is attached to the cross slide 81. Suitable guiding means are provided between the bearing plate 93 and the magnet slide 91. An armature plate 105 is mounted on the under surface of the work slide 101 and is disposed parallel to the gibs 103 for engagement with the upper surfaces of the magnets 89.

A third electromagnet 95 (see Figure 3) is fixed to the cross slide 81. A mating armature plate is attached to the under surface of the work slide 101 for engagement with the upper surface of the magnet 95. The fixed magnet 95 acts as a holding magnet for the work slide 91 while the movable magnets 89 are being moved rearwardly in preparation for advancing the work slide for another cut of a circuit board. The magnets 89 and 91 are energized alternately. The magnet slide 91 is driven by a double-acting air cylinder 97 and is directly coupled to the piston rod 99 of the air cylinder.

A micrometer screw 94 is mounted in a forward bracket of the bearing plate 93 to provide a forward stop for the magnet slide 91. This screw acts in cooperation with a scale on the transverse slide 81 to provide for the accurate setting of the amount of advance of the circuit board after each successive shear.

The work slide 101 is provided at its forward edge with a pair of clamps 109 and 111. The clamp 109 is rigidly attached to the forward edge of the slide adjacent one side. The clamp 111 is rigidly fixed to the end of a rectangular rod 113 which rides in a longitudinal rectangular groove 115 provided in the upper surface of the slide 101. The rectangular rod 113 is reciprocated in its groove 115 by a motor 117 which is mounted at the rearward end of the work slide 101. The motor 117 is directly coupled to a screw 119 extending parallel to the groove 115. A tapped block 121 extends upwardly from the rectangular rod 113 at the end of the rod opposite from the clamp 111 and is engaged by the screw 119.

Each of the clamps 109 and 111 is provided with a fixed lower bearing surface 123. The upper portion of each clamp comprises an arm 125 which is pivotally mounted intermediate its ends. The end of the arm 125 which opposes the lower bearing surface 123 is provided with a pin 127 extending toward the lower bearing surface and terminating in a point. When the board is held by the clamps 109 and 111, the pointed portions of the pins drive into the surface of the board to hold the board against longitudinal or transverse movement relative to the clamps. The clamp 111 is driven either forward or backward in a longitudinal direction pivoting the board about the clamp 109 to provide for accurate rotational adjustment of the circuit board in relation to the contacts.

The elevation of the lower bearing surface 123 of the clamps is somewhat greater than the upper surface of the work slide 101. This provides a clearance to accommodate table portions 131 and 133 upon which the circuit board slides as it is advanced toward the shear. The table portions 131 and 133 are constructed of a thin plate material and are attached to the machine frame at the forward end of the machine. The table comprises a central portion 131 and the two side portions 133. These portions are separated to provide longitudinal paths through which the clamps 109 and 111 pass as the work slide is advanced toward the shear. The work slide 101 moves immediately underneath the table portions while the circuit board rides atop the table portions.

A hold down member 135 is positioned over the center table portion 131 to maintain the circuit board flat against this table portion during the indexing and advancing operations. This hold down member comprises a T-shaped plate having a plurality of spherical bearings 136 mounted on the under side of the plate for engagement with the upper surface of the circuit board. Hinge brackets 137 are provided at the forward end of the plate, which is the transverse arm of the T, for rotation around a rod 138 which is suitably supported on the machine frame.

*Clutch assembly*

Figure 5:
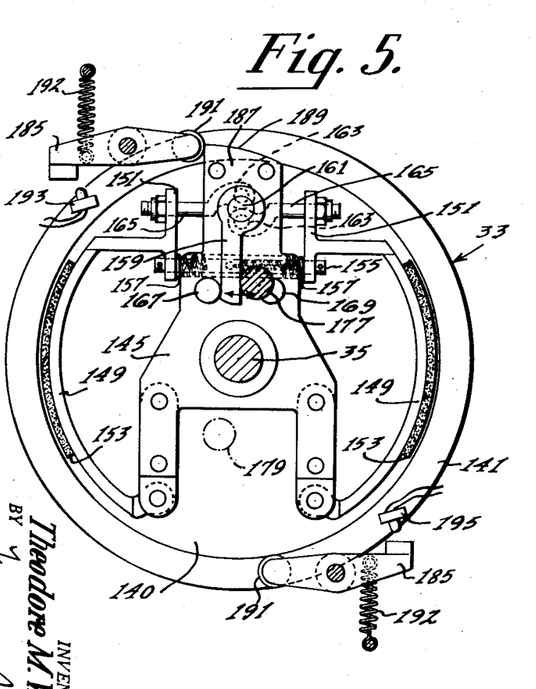
Figure 5 is a detail view in plan illustrating the clutch in a locked position.
Figure 6:
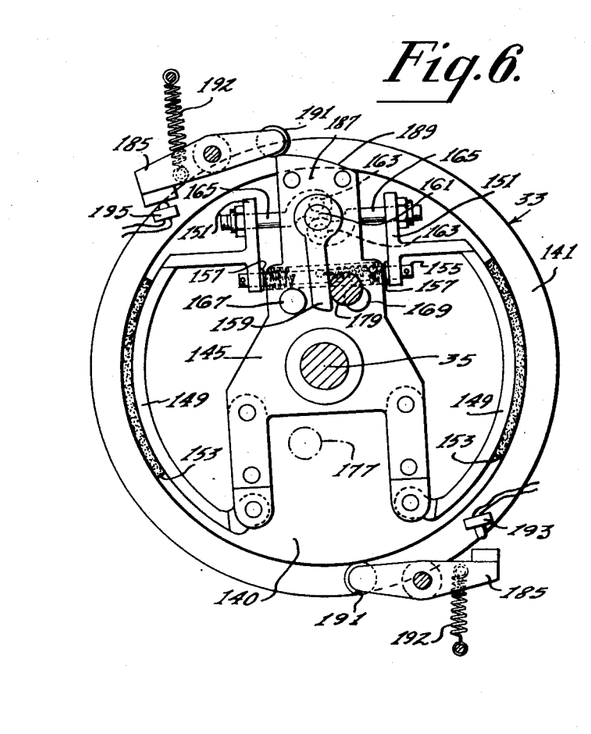
Figure 6 is a detail view in plan illustrating the clutch just prior to a locking position.

Referring now to Figures 1, 5 and 6 the operation of the clutch 33 will be described. The clutch is mounted for rotation about a vertical axis and is shown in elevation in Figure 1. The clutch input comprises a disc 140 having an upwardly extending annular flange 141. The disc 140 is driven at constant speed by a suitable drive source such as a motor 143. The clutch output comprises a plate 145 which rotates essentially within the flange 141 and to which is attached the upwardly extending output shaft 35. A pair of arcuate shoe arms 149 are each pivotally attached at one end to the plate 145 and terminate at the other end in parallel end faces 151. A shoe 153 is mounted on each of the shoe arms 149 for engagement with the inner surface of the flange 141. These shoes engage the flange at opposing sides. A pin 155 extends through the end faces 151, in apertures provided therefor, and supports a helical compression spring 157. The spring 157 urges the end faces 151 away from each other and hence urges the shoes 153 against the flange 141 to engage the clutch.

A clutch actuating lever 159 moves in a plane parallel to the upper surface of the plate 145 and is rigidly attached to a crank shaft 161 which extends downwardly through the plate. Two downwardly extending crank pins 163 are rigidly attached to the lower end of the crank shaft 161. These crank pins 163 are equidistant from the axis of rotation of the crank shaft 161 and lie in a plane passing through the axis of the shaft 161. A connecting link 165 extends through, and is carried by, each of the end faces 151. These connecting links are aligned on a common line and extend from the end faces 151 toward each other. The adjacent ends of these links are offset and each is provided with an aperture adapted to receive one of the crank pins 163. These apertures are aligned along a line which is substantially perpendicular to the connecting links 165. It will now be seen that when the clutch actuating lever 159 is rotated to its clockwise position, as illustrated in Figure 5, the crank shaft 161 causes the shoes 153 to be drawn toward each other and away from the flange 141 to release the clutch. Pins 167 and 169 are fixed to the clutch plate 145 and limit the amount of rotation of the clutch actuating lever 159.

Referring now to Figure 1, the clutch is controlled by a lever mechanism comprising a T-shaped lever 175 which is pivotally mounted about a horizontal axis at the intersection of the T. Pins 177 and 179 are carried on opposite ends of the transverse arm of the T and extend downwardly from the arm. The vertical arm of the T extends upwardly and is linked to two opposing solenoids 181 and 183 which selectively actuate the lever 175 in either direction, rocking it about its mounting axis. This rocking of the lever 175 causes one or the other of the pins 177 or 179 to be positioned at a point where it will engage the clutch actuating lever 159 as the clutch plate 145 rotates. In Figure 5, the clutch is shown in a locked position in which the clutch is disengaged. The pin 177 is shown in the downward position and is engaged by the clutch actuating lever 159 which has been forced against the limit pin 167 due to the clockwise rotation of the clutch. This action has stopped the clutch output against further clockwise rotation and the rotation of the lever 159 against the limit pin 167 has drawn the shoes 153 away from the flange 141.

In order to lock the clutch output against rotation in either direction, a rocker arm 185 is mounted to rock about a vertical axis which is fixed in relation to the machine frame. The clutch plate 145 is provided with a radial extension 187 having a cam surface 189 at its outer end. This cam surface is adapted to engage a roller 191 mounted on the rocker arm 185 and to displace the rocker arm as the cam surface passes by. When the clutch is disengaged, as previously described, and the output plate 145 is stopped, the radial extension 187 is moved just sufficiently past the rocker arm 185 so that the arm and roller 191 slip in behind the radial extension 187 and prevent counter-clockwise rotation of the plate. The rocker arm 185 is biased by means of a spring 192 to urge the roller 191 into its locking position behind the radial extension 187.

Referring now to Figure 6, the clutch plate 145 is shown in a position just prior to a locking position. To release the clutch from the locked position described in the preceding paragraphs, the solenoid 181 is energized. This solenoid rocks the lever 175 to raise the pin 177 out of the path of the clutch actuating lever 159 and to lower the pin 179 to a position where it will be engaged by the lever 159 when the clutch plate rotates 180°. As soon as the pin 177 is disengaged from the lever 159, the lever 159 is rotated in a counter-clockwise direction, against the limit pin 169, due to the force exerted by the compression spring 157 against the end faces 151. The spring 157 also forces the shoes 153 into engagement with the flange 141 and the clutch plate 145 is caused to rotate.

As the clutch plate approaches the next stop position, the cam surface 189 of the radial extension 187 engages the roller 191 causing the rocker arm 185 to pivot about its axis. When the rocker arm is in this displaced position, the end of the arm opposite from the roller 191 is caused to engage a micro-switch 195, the function of which will be described subsequently. The clutch actuating lever 159 engages the pin 179 before the clutch plate has completed its rotation. Upon engagement of these members, the actuating lever 159 is again rotated in a clockwise direction toward the limit pin 167 disengaging the shoes 153 from the flange 141. The rocker arm 185 then locks the plate as previously described.

*Contact assembly*

Figure 7:
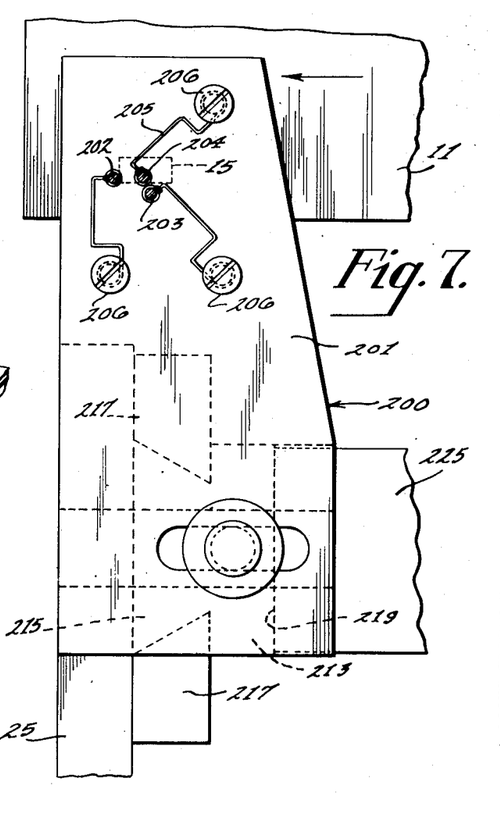
Figure 7 is an enlarged fragmentary view in plan of a contact assembly illustrating its relationship to a circuit board.
Figure 8:
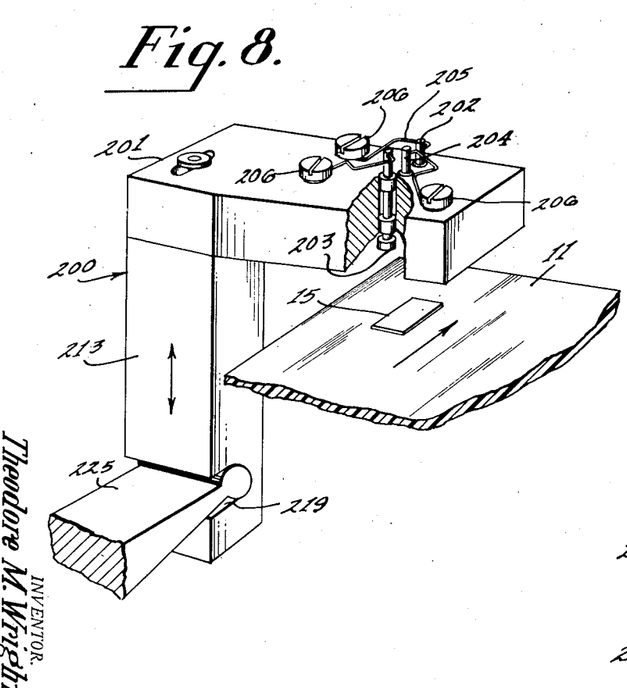
Figure 8 is a perspective view of the contact assembly of Figure 7.
Figure 9:
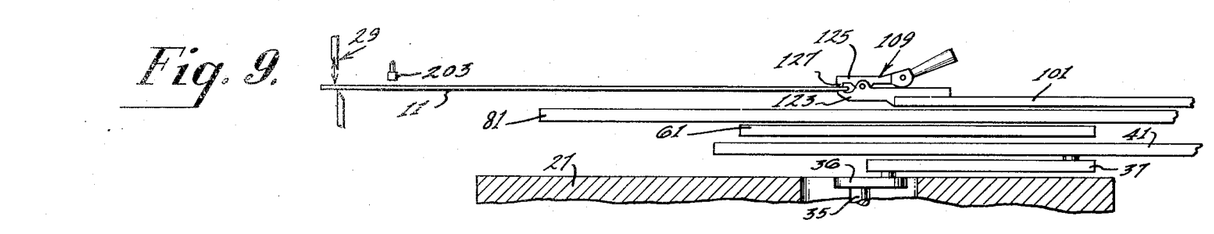
Figures 9 to 12 are diagrammatic views in side elevation illustrating the operating cycle of the several slides.
Figures 10, 11:
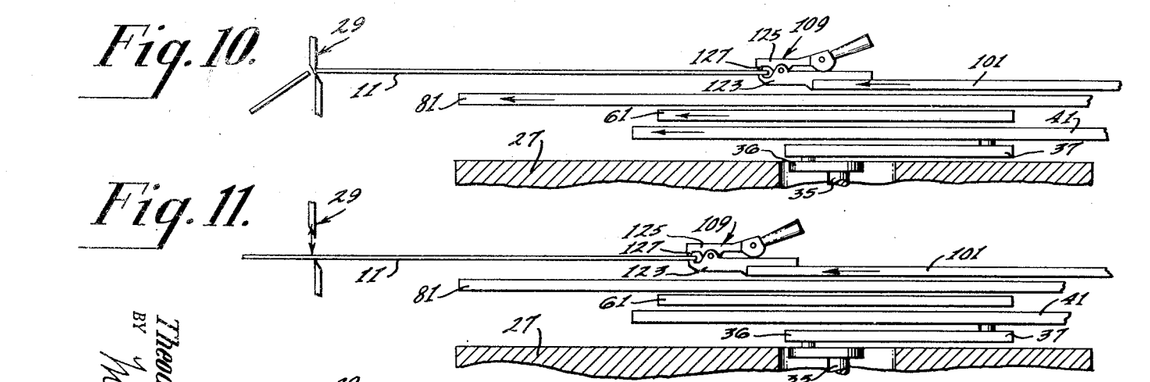
Figure 12:
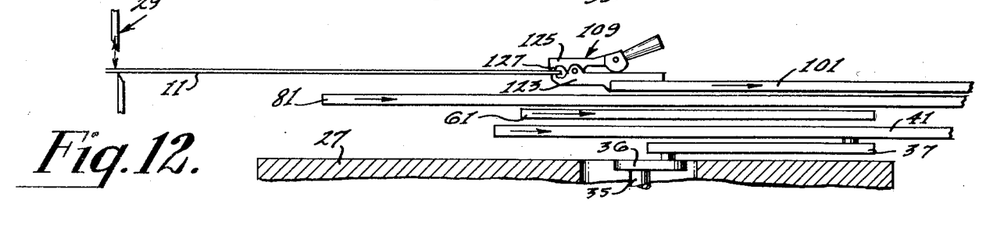

When a printed circuit board is positioned on the machine, the side of the board having the printed circuit is facing upwardly. The index code marks 15 and 17 are read by metallic contact pins which are moved downwardly to engage the upper surface of the board. Referring now to Figures 7 and 8, a contact assembly 200, which reads the code marks 15 spaced along the left hand edge of the board is illustrated. This assembly comprises three floating contact pins which are slidably mounted in a terminal block 201. A contact 202 is positioned so that it will be aligned with an index code mark 15 and make contact with the leading edge of this index code mark. This contact 202 will be referred to as the rotary contact. A contact 203 is aligned so that it will be positioned adjacent the left hand edge of an index mark 15 and is adapted to be engaged by the left hand edge of the code mark 15. This contact 203 will be referred to as the transverse contact. A contact 204 is positioned directly over the index code mark 15 and is the common terminal contact for the circuits of the rotary and transverse contacts. Each of these contact pins extends through the mounting block 201 and each is supported by a wire spring 205. These springs 205 are clamped to the mounting block by terminal screws 206 and each extend through an aperture in a contact pin located adjacent the top of the pin. These springs 205 provide for the floating action of the contact pins and also provide the electrical connection between the pins and the terminal screws 206.

The contact mounting block 201 is attached at one end to the upper end of a slide block 213 having a vertically extending dovetail slide 215. Gibs 217 are provided on the machine frame for engaging the dovetail slide 215 and guiding its vertical movement. The block 213 is provided with a transverse groove 219 on the side opposite from the dovetail slide 215 for engagement by an operating mechanism to be described.

A contact assembly 210 similar to the assembly just described is provided to cooperate with the index code marks 17 which are located along the right hand edge of a circuit board. This assembly differs from the assembly described above only in that it is adapted to lie over the opposite edge of the printed circuit board and in that it is provided with only two contacts. A contact 211 will be referred to as the longitudinal contact and is positioned to be engaged by the leading edge of a code mark 17. A second contact 212 is the terminal contact and is positioned directly over the code mark 17. Due to the similarity of this contact assembly with the assembly previously described and illustrated, no illustration is provided for this assembly.

Contact positioning mechanism

Referring now to Figures 1 and 3, a pair of rocker arms 225 are each pivotally mounted on a bracket 227. These arms are positioned at each side of the apparatus adjacent the slide blocks 213. One end of each rocker arm is provided with a cylindrical bearing surface which is received within the transverse groove 219 of the slide block 213. A rocking of the rocker arms 225 about their pivots then causes an upward or downward movement of the slide blocks within the gibs 217. The actuating mechanism for these rocker arms 225 comprises a transverse shaft 229 rotatably mounted in suitable bearings. A pair of arms 231 are rigidly fixed to the shaft 229 and extend substantially horizontally toward the forward end of the machine. Each of these arms is coupled, by means of a link 233, to the end of a rocker arm 225 which is opposite from the contact slide block 213.

A downwardly extending arm 235 is rigidly fixed to the shaft 229 at a point intermediate its ends. A cam 237 is rigidly fixed to the clutch output shaft 35. This cam is circular except for a detent or depression 239 provided at one point on its peripheral surface. A transversely extending arm 241 is pivotally attached, at one end, to the machine frame and is provided with a cam follower 243, intermediate its ends, which engages the cam surface of the cam 237. The free end of this arm 241 is coupled to the arm 235 by means of a link 245. A spring 247 is provided to urge the cam follower 243 against the cam 237. The cam and cam follower are so positioned, relatively, that the detent 231 receives the follower 243 at one of the lock positions of the clutch output shaft 35. The operational sequence of this mechanism will be described subsequently.

A small upward extending arm 251 is rigidly fixed to the shaft 229 adjacent one end of the shaft. A lever 253 is rotatably mounted on the shaft 229 and extends substantially upward therefrom. This lever is provided with a transverse pin 255 which engages the arm 251 at a certain point in its rotation. The lever 253 is provided with integral projecting members 257 and 259 which extend substantially perpendicular to the lever 253 and substantially radially of the shaft 229. These projections are provided to actuate a pair of pressure switches 265 and 267, the function of which will be described subsequently. The lever 253 is coupled to a manually operable lever 261 which is pivotally mounted at the rear of the machine. The lever 261 extends substantially parallel with the lever 253 and is connected to it by means of a link 263. The lever 261 is shown diagrammatically in Figure 14.

The contact slide blocks 213 are moved upwardly and downwardly during normal machine operation by means of the cam 237. When the machine is in position for the indexing cycle, the shuttle slide 41 is in its rearward position, illustrated in Figures 1, 3, 9 and 12, and the clutch is locked in what will be referred to as its rearward position. In this position of the clutch, the detent 239 of the cam 237 is positioned to receive the cam follower 243 so that the arm 241 is pivoted to its forwardmost position. The shaft 229 and its associated arms are rotated to their clockwise limit, illustrated in Figure 1, and the contact mounting blocks 201 are disposed at their lowermost position in which the contacts will engage the printed circuit board.

As soon as the clutch is actuated to move the shuttle slide forward, the cam 237 moves the arm 241 to its rearmost position causing the shaft 229 to be rotated in a counter-clockwise direction. The contact mounting blocks 201 are thereby raised to disengage the contacts from the circuit board. The cam 237 will maintain the contact mounting blocks in this position throughout the subsequent operations of the machine and will not again permit the contacts to engage the circuit board until the shuttle slide has returned to its rearmost position and the machine is ready for the next indexing cycle.

In the event that it should be necessary to raise the contacts from the circuit board during the indexing cycle, this can be accomplished by moving the manual lever 261 forward which imparts a forward or counter-clockwise rotation to the lever 253 about the shaft 229. The pin 255, which is attached to the lever 253, then engages the arm 251 causing rotation of the shaft 229 in a counter-clockwise direction to raise the contact mounting blocks 201 as already described.

Two pressure operated switches 265 and 267 are mounted to be engaged respectively by the projections 257 and 259 of the lever 253. During the normal operation of the machine, the lever 253 is positioned at its rearward position so that the switch 265 is closed and the switch 267 is engaging its NC (normally closed) contact. When it is desired to raise the index contacts during the indexing cycle of the machine, the lever 253 is moved forward to an intermediate position where the projection 259 engages a spring loaded limit button 268. In this position of the arm 253, the switch 265 is open and the switch 267 is engaging neither its NC contact nor its NO (normally open) contact. When the arm 253 is returned to its rearward position the operation of the machine is resumed from its point of interruption. Should it be desirable at any point in the operating sequence of the machine, to return the machine to the beginning of its operational cycle, the lever 253 may be moved all the way forward against the pressure of the spring loaded limit button 268 at which point the switch 267 engages its NO contact. This is the clearing position of the switch 267 which clears the complete operating circuit in a manner to be described.

Overall operation

Referring now particularly to Figures 9 to 12 and also to Figures 13 and 14, the operational cycle of the machine will be described in conjunction with a description of the operating circuit.

Prior to the beginning of an operational cycle, the machine is set up in the following manner. The shuttle slide 41 is locked in its rearmost position by the clutch 33. The cam 237, which is mounted on the clutch output shaft, is then positioned so that its detent 239 receives the cam follower 243 mounted on the follower arm 241. The cam then permits the contact assembly linkage to lower the contact assemblies 200 and 210 to the position where the contacts may engage a circuit board. However the levers 261 and 263 are in their intermediate positions which holds the contact assemblies 200 and 210 in their upward position wherein the contacts are raised from the position of engagement with a circuit board. The switches 265 and 267 are open. The magnet slide 91 is positioned against its forward stop, the micrometer screw 94, and is held there by the air cylinder 97.

Two stepping switches are provided in the operating circuit. A stepping switch 271 is provided for selectively energizing three identical motor circuits 285, 287 and 289. A stepping switch 273 is provided for counting each cut that is made on a circuit board. Both of these stepping switches are set at the zero position. A selector switch 275 is provided to operate in conjunction with the stepping switch 273. A selector arm 277 of this switch is set to select the number of cuts which are to be made on a single circuit board.

Since the work slide 101 is in its rearmost position with respect to the cross slide 81 and since the contact assemblies 200 and 210 are raised, a printed circuit board may now be inserted and fixed in the clamps 109 and 111. When the circuit board is fixed within the clamps, it is positioned so that the first pair of index code marks 15 and 17 of the board is disposed beneath the contact assemblies 200 and 210 respectively. The lever 261 is now moved to its rearward position closing the switch 265 to provide ground for the indexing and sheer circuits and engaging the switch 267 with its NC (normally closed) contact to provide power for the magnet circuits and the air cylinder valve circuit. The machine is now ready to begin operation.

Figure 13:
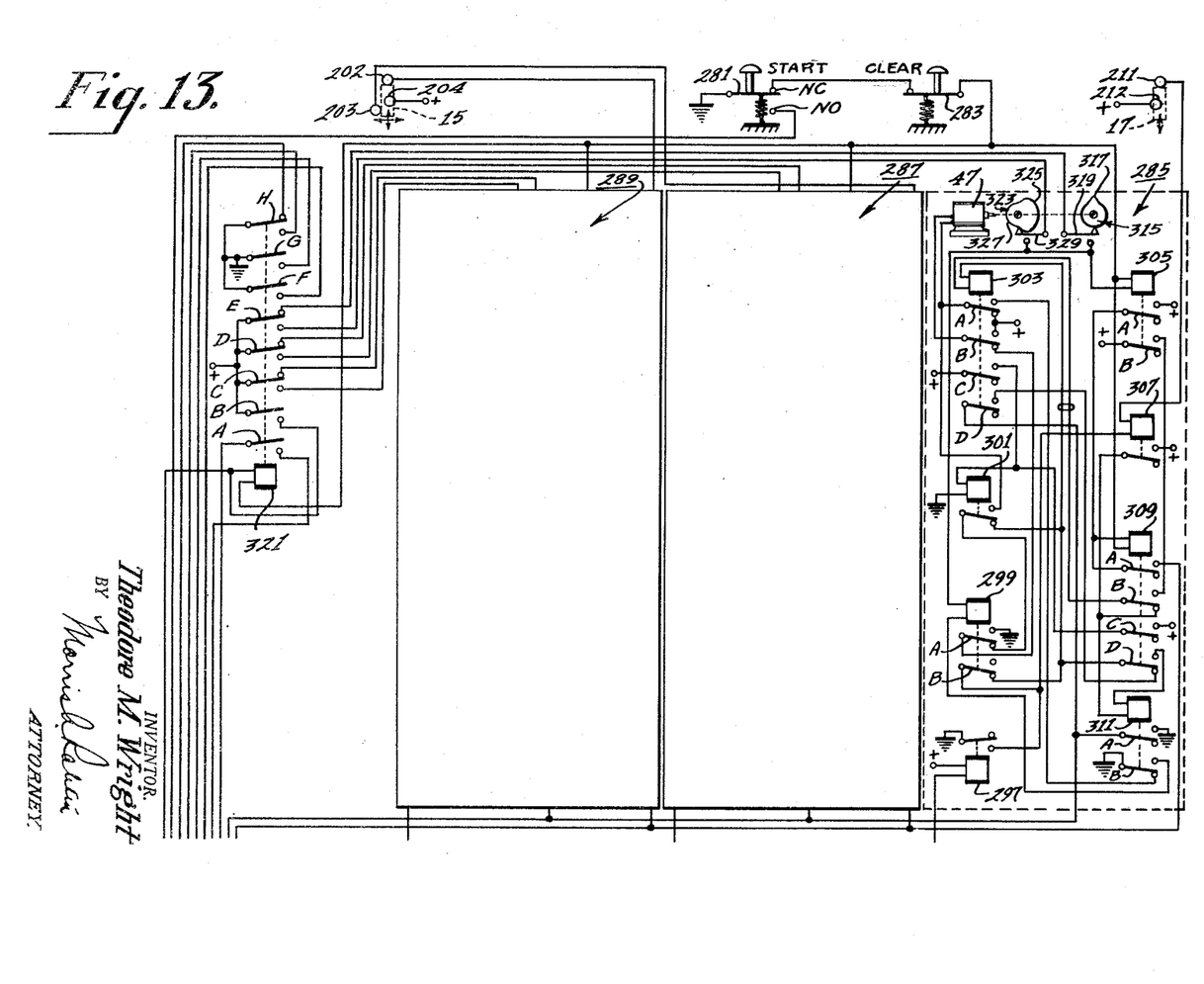
Figures 13 and 14 are schematic circuit diagrams illustrating an operating circuit for the machine.
Figure 14:
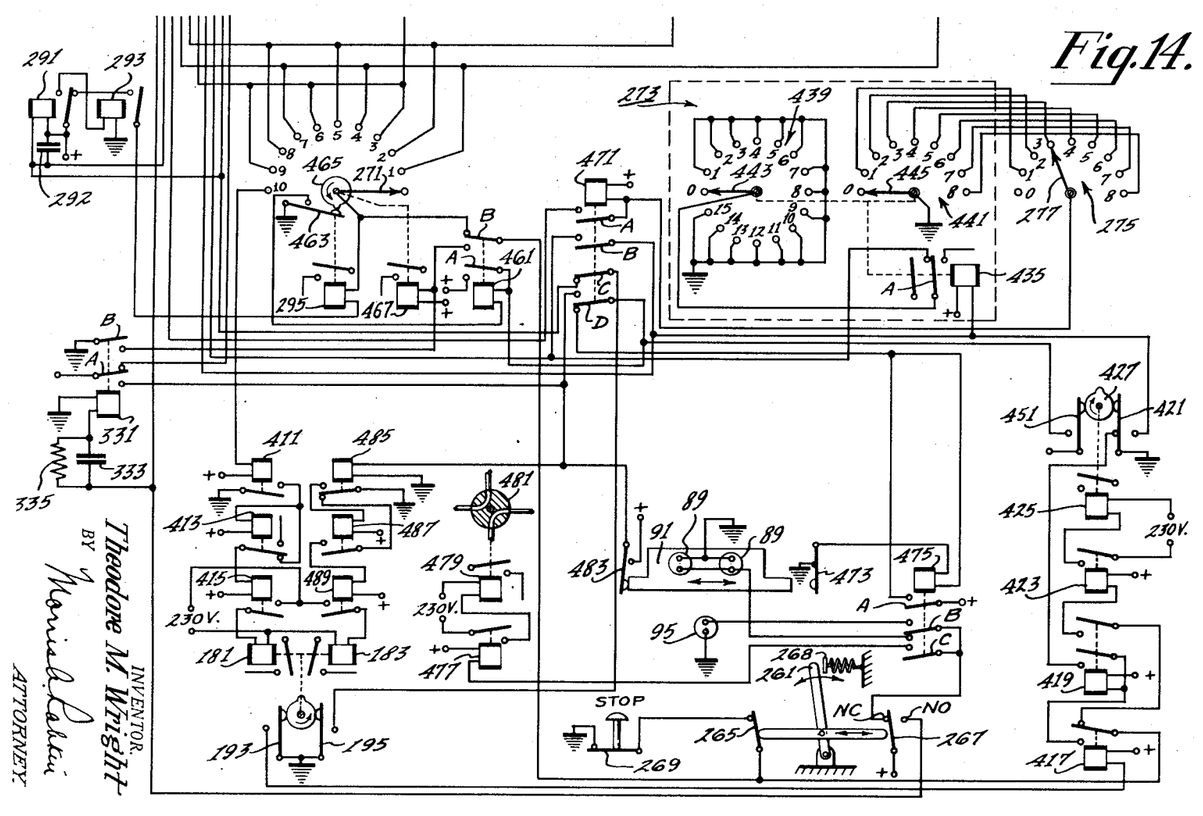

All of the circuit relays are in their NO (normally open) positions which are the positions illustrated in Figures 13 and 14. A two position start switch 281 is engaging its NC (normally closed) contact. A clear switch 283 and a stop switch 269 are closed.

In the circuit of Figures 13 and 14, a low voltage D. C. source is provided for the operation of most of the relays and solenoids. This power source is indicated by +. Certain solenoids require greater power as indicated in the drawings.

*Indexing circuit and operation*

The indexing circuit comprises three identical motor circuits 285, 287 and 289 for operating respectively each of the motors 47, 73 and 117. Each of the motors has a forward and reverse driving direction. The motor 47 when driving in the forward direction carries the longitudinal slide forward. The motor 73 when driving in the forward direction drives the transverse slide to the left. The motor 117 when driving in the forward direction drives the movable clamp 111 forward to rotate the circuit board 11 in a clockwise direction with respect to the fixed clamp 109. The motor circuits are each connected to the stepping switch 271 which sequentially energizes these circuits. Since the operation of the motor circuits is identical, only the operation of the motor circuit 285 will be described in detail.

To begin operation of the machine, the start switch 281 is depressed to engage its NO contact. This provides ground to pull a relay 291 which is part of a two relay cocking circuit for the stepping switch 271. The arm of relay 291 then engages its NC contact to provide power to pull a slow release relay 293 of the cocking circuit.

This circuit is now cocked and remains in readiness to provide power for the operation of the stepping switch 271 when the relay 291 is released. A capacitor 292 is connected across the leads of the relay 291. This capacitor delays release of the relay when ground is taken away. This delay is necessary for the operation of the limit control which will be described subsequently. When the relay 291 is released, the relay 293 holds momentarily to provide power through the NO contact of relay 291 and the arm of relay 293 to energize an operating solenoid 295 for the stepping switch 271. Ground is provided for the solenoid 295 through the arm B of a relay 461, the switch 265 and the stop switch 269. Energization of the solenoid 295 causes the stepping switch to step from its zero position to its first position providing ground to pull the ground relay 297 in the motor circuit 285.

As described above, the circuit board 11 is positioned so that the code mark 17 is approximately in its proper position with respect to the longitudinal contact 211 and the terminal contact 212. Assume now that the code mark 17 is not in engagement with the contact 211 when the ground relay 297 is pulled. Ground is provided through the arm B of a ground control relay 299, through the arm of a shorting relay 301, through the arm A of ground control relay 299 and through the arms B and A of a motor relay 303 to energize the motor 47 in the forward direction. The lingitudinal slide 61 is then driven forward until the code mark 17 engages the longitudinal contact 211. A circuit is then completed through terminal contact 212, the code mark 17, and the longitudinal contact 211 to provide power to pull a patch relay 307. Ground for the patch relay 307 is provided through the arm of the ground relay 297. Power is then provided through the arm of the patch relay 307 and the arm B of a locking relay 309 to pull the motor relay 303. Ground is provided for the motor relay 303 through the arm B of the ground control relay 299 and the arm of ground relay 297.

As soon as the motor relay 303 is pulled, its arms A and B engage their NC contacts to reverse the leads to the motor 47 and hence reverse the direction of drive of the motor to carry the longitudinal slide backward. This moves the code mark 17 out of engagement with the longitudinal contact 211. Power is provided through an arm C of the motor relay 303 to pull the shorting relay 301 which is a slow release relay. The arm D of the motor relay engages its NO contact to complete a circuit for pulling the cocking relay 291. Ground for this circuit is provided through the arm of ground relay 297, the arm 299B, the arm 309D, and the arm 303D. The cocking circuit is then cocked as previously described.

When the code mark 17 breaks contact with the longitudinal contact 211, the patch relay 307 releases to immediately take away power from the motor relay 303. The arms 303A and 303B again engage their NO contacts to reverse the leads to the motor 47; however the motor will not again drive in the forward direction. The arm 303C breaks the power supply circuit for the shorting relay 301. However the shorting relay, being a slow release relay, does not release immediately and a short circuit is momentarily provided across the motor leads to provide a braking action for the motor 47. The shorting circuit is completed from the motor 47 through the arm 303B, the arm 299A, and the arm of shorting relay 301. The shorting relay 301 maintains this short circuit long enough for the cocking circuit to energize the stepping switch to the next position. This is accomplished when the arm 303D returns to its NO contact breaking the ground circuit for the cocking relay 291. The relay 291 is then released and the stepping switch 271 is stepped in the manner previously described to its second position. The motor circuit 287 is then energized through a ground relay 297–2 and the ground relay 297 is released taking ground away from the motor circuit 285 to prevent further operation of this circuit.

The motor circuit 287 then operates in a manner similar to the motor circuit 285 being controlled by the transverse contact 203 and the common terminal contact 204 in conjunction with the index code mark 15. When the stepping switch 271 is again tripped, the switch moves to the third position to pull a ground relay 297-3 in the motor circuit 289. The circuit 289 then operates in a manner similar to the circuit 285 being controlled by the rotary contact 202 and the common terminal contact 204 in conjunction with the index code mark 15. When this motor circuit 289 again trips the stepping switch 271, the switch moves to position four and again pulls the ground relay 297 to energize the motor circuit 285. This cycle of energizing the three motor circuits may be repeated as many times as desired. The illustrated stepping switch 271 has ten positions providing for the cycling through the three circuits three times. Positions 1, 4 and 7 of the stepping switch 271 are connected in parallel with the ground relay 297. Positions 2, 5 and 8 of the switch are connected in parallel with ground relay 297-2. Positions 3, 6 and 8 of the switch are similarly connected in parallel with the ground relay 297-3. The tenth position of the switch 271 provides for the control of the succeeding operation.

Returning now to the beginning of the operation of the motor circuit 285, assume that when the contacts 211 and 212 are lowered to engage the circuit board 11, the index code mark 17 is positioned to immediately engage both of these contacts. In this event the circuit is completed to immediately pull the patch relay 307 which in turn pulls the motor relay 303 to place the motor lead arms 303A and 303B in the reverse driving position. In this instance, when the start switch 281 is engaged with its NO contact, the longitudinal slide is merely driven backward until the code mark 17 just moves off the longitudinal contact 211. The circuit will then act as previously described shorting out the motor 47 and actuating the stepping switch 271 to energize the succeeding motor circuit 287.

*Limit operation*

Each of the motor circuits 285, 287 and 289 include a limiting circuit which limits the amount of drive of its respective motor in either direction. This limiting circuit and its operating mechanism may be set up, for example, to permit each motor to drive its respective member two tenths of an inch in either direction from the zero position. Referring again only to the operation of the motor circuit 285, the limiting circuit is controlled by a limit cam 315 which is coupled to the motor 47. A zero set cam 323 is also coupled to the motor 47 and rotates with the limit cam 315 at the same angular velocity. The limit cam 315 is provided with a circular peripheral surface having a tab 317 extending from this surface at one point. The arm of a switch 319 rides on this peripheral surface. This switch is normally open and is closed only when the tab 317 engages the switch arm. The zero set cam 323 is provided with a high peripheral surface 325 and a low peripheral surface 327, each being defined by a different radius and each extending approximately 180° about the periphery of the cam. The limit cam and zero set cam have a definite phase relationship which is illustrated in Figure 13. In the zero position, which is the position illustrated, the tab 317 of the limit cam 315 is exactly opposite its point of engagement with the arm of switch 319. In the zero position of the zero set cam 325, the arm of a switch 329 rides on the low surface 327 adjacent a shoulder which separates the low surface from the high surface. In the normal limit operation of the limit cam, as soon as the tab 317 engages the switch arm 319 the motor 47 stops. Necessarily then, the cam will rotate something slightly less than 180° from the zero position in either direction of rotation before it reaches the limit. The high and low surfaces of the zero set cam are arranged so that if the cams rotate any amount up to the limit in a clockwise direction, which is the forward driving direction of the motor 47, the arm of switch 329 will be riding on the high surface 325 and the switch will be closed. If the cams rotate any distance up to the limit in a counter-clockwise direction, the arm of switch 329 will be riding on the low surface 327 of the cam and the switch will be open. The significance of this will become apparent when the operation of the zero set cams is described.

During the indexing operation, one terminal of the limit switch 319 receives power from arm E of a relay 321. Similarly the limit switches for the indexing circuits 287 and 289 receive power respectively through the arms D and C of the relay 321. One terminal of the zero set switch 329 receives power through the arm E of relay 321 when the relay is pulled. During the operation of the limit circuit then, the zero set switch 329 is inoperative. The operation of the zero set cams will be described subsequently.

Assume now that at the beginning of the operation of the indexing circuit 285, the index code mark 17 is not engaging the longitudinal contact 211. When the circuit is energized then the motor 47 drives the circuit board 11 forward. Further assume that, for some reason, the code mark 17 does not make contact with the longitudinal contact 211 and the motor 47 drives the limit cam to its limit in a clockwise direction. When the tab 317 engages the arm of switch 319, the switch closes and provides power to pull a limit relay 305 which receives ground through the start switch 281 and the clear switch 283. At the same time power is provided for the ground control relay 299 which seeks ground through the arm 311B of relay 311 but does not receive ground at this time. Power is provided through the arm 305A to pull the locking relay 309 which also receives ground through the start switch 281 and the clear switch 283.

When the locking relay 309 has pulled, a circuit is completed through its arm A and the arm A of a one shot relay 331 to provide power for holding the locking relay 309 until the machine is cleared. The clearing operation of the machine will be described subsequently. Power is provided through the arm 305B and the arm 309B to pull motor relay 303 which reverses the motor lead arms 303A and 303B to drive the limit cam in the counterclockwise direction. Power is also provided through the arm 309C to pull the shorting relay 301. The circuit for pulling the cocking relay 291, previously described, includes the arms 309D, 303D and 299B. In the present operation this circuit is broken at the arm 309D prior to the time it is closed at the arm 303D. Therefore the cocking relay 291 is not pulled during this operation since it is not desired to cock the circuit at this time for stepping the stepping switch 271. The arm 303C again provides power for the shorting relay 301, however this accomplishes nothing since the relay has already been pulled through the arm 309C.

When the limit cam has driven in the counter-clockwise direction just sufficient to move the tab 317 off of the switch arm 319, the limit relay 305 releases and breaks the power circuit for the motor relay 303 at its arm 305B. The motor lead arms 303A and 303B again return to the forward driving position but the motor is again shorted through the shorting relay 301 as previously described. The locking relay 309 is not released and the shorting relay 301 is held until the relay 309 is released. Through manual operation, this can be accomplished either by taking away ground from the locking relay 309 by depressing the clear switch 283 or by pulling the one shot relay 331 to take power away from the locking relay 309. It will be seen that the normal procedure is to take the power away from the relay 309. This is accomplished through the clearing operation of the machine. This clearing operation also returns the limit cam to the zero position.

Assume now that at the beginning of the indexing operation, the code mark 17 is engaging the longitudinal contact 211. In this event the patch relay 307 is pulled immediately which in turn pulls the motor relay 303 through the arm 309B as previously described to set up the motor 47 for driving in the reverse direction. When the motor circuit 285 is energized through the ground relay 297, assume now that the code mark 17 does not move off the longitudinal contact 211 and the limit cam 315 rotates to its limit in a counter-clockwise direction to engage the switch 319. The limit relay 305 is again pulled and in turn pulls locking relay 309 which again remains pulled until manually released. Power is again applied through switch 219 to the ground control relay 299 which seeks ground through the arm 311B but does not receive it immediately. In this operation of the limit cam, the code mark 17 and longitudinal contact 211 are continually in engagement so that the patch relay 307 is pulled throughout the operation. Power is provided through the arm of the patch relay 307 to pull the relay 311 which receives ground through the arm 309D, the arm 299B and the ground relay 297.

When the motor relay 303 was originally pulled due to the engagement of the code mark 17 and the longitudinal contact 211, a circuit was completed through the arms 303D, 309D and 299B to pull the cocking relay 291. If this circuit is broken during the operation of the limit circuit, the cocking relay 291 will be immediately released and the stepping switch 271 will step to the next position to energize the succeeding motor circuit prior to completion of the limit circuit operation. Since this is not desired, a means must be provided to hold ground on the cocking relay 291 while the motor is reversed to the forward drive direction by the limiting circuit. This means is the capacitor 292 which is placed across the leads of the cocking relay 291, the positive side of the capacitor 292 being connected with the positive lead to the relay. When the locking relay 309 is pulled, the ground circuit to the cocking relay 291 is broken when the arm 309D moves off its NO contact. The NC contact of the arm 309D is connected to the ground side of the relay 311 which receives power through the arm of the patch relay 307. Ground is then provided for the relay 311 through the arms 309D, 299B and the arm of relay 297. As soon as the relay 311 is pulled, ground is put back on the cocking relay 291 through the arm 311A. Between the time the cocking relay 309 is pulled and the relay 311 is pulled, it is necessary to prevent the cocking relay 291 from releasing. This is accomplished through the capacitor 292 which acts as a small battery immediately after the ground is removed to hold the relay 291 a sufficient time for the above described action to take place.

When the relay 311 is pulled, ground is taken away from the NC contact of the arm 303A and hence the motor 47 at the arm 311B. This stops the motor 47 from driving in the reverse direction. The arm 311B then engages its NC contact to provide ground for the ground control relay 299 which immediately pulls. The arm 299A breaks the heretofore described shorting circuit for the motor 47 and puts ground directly on the NO contact of the arm 303B to complete a circuit to drive the motor 47 to drive in the forward direction. The arm 299B moves to its NC contact breaking the ground circuit to the motor relay 303 to release this relay.

Due to the above condition, the motor 47 is now driving forward to move the tab 317 out of engagement with the switch 319. As soon as the switch 319 opens, the limit relay 305 is released and the relay 299 is released since power is taken away. The motor shorting circuit is again completed through the arm 299A stopping the motor 47. Ground is again applied to the motor relay 303 through the arm 299B, however this relay does not pull since the power circuit for the relay is broken at arm B of the limit relay 305. Since both the patch relay 307 and the locking relay 309 remain pulled, the relay 311 is held to maintain ground on the cocking relay 291. The circuit will not then operate again until it is cleared through the clearing circuit.

*Positioning, shearing and advancing operation*

When the stepping switch 287 reaches the number ten position a relay 411 is pulled which in turn pulls a slow open relay 413. Prior to the opening of the slow open relay 413, a circuit is momentarily completed through the arms of relays 411 and 413 which pulls a relay 315 closing the power circuit for the clutch actuating solenoid 181. The solenoid 181 rocks lever 175 to release pin 177 from engagement with the clutch actuating lever 159 and positions the pin 179 to be engaged by the clutch actuating lever 159 after it has been carried 180°. As soon as the output shaft 35 of the clutch starts to rotate, the cam 237 forces the cam follower 243 out of its detent 239 and the follower rides on the outer periphery of the cam. This causes the contact assemblies 200 and 210 to be raised from the position of engagement with a circuit board through the linkages already described. This is necessary since the rotation of the clutch now advances the shuttle slide 41 to its forward position by means of the crank 36 and the crank arm 37 for the purpose of positioning the circuit board 11 to be sheared. To leave the contacts in engagement with the board would introduce excessive wear of the contacts.

As the clutch locks the shuttle slide in its forward position, the microswitch 193 is momentarily closed by the rocker arm 185 of the clutch operating mechanism as already described. The closing of the switch 193 provides a pulse which momentarily pulls a relay 417 in the shear actuating circuit. This causes a relay 419 to pull which holds through its own contact arm and a switch 421. When the relay 417 releases, a circuit is completed through the contacts of the relays 317 and 319 to pull a relay 423 which closes the power circuit for a shear actuating solenoid 425. As the shear moves downward in its cycle to shear the circuit board, the switch 421 is tripped by a switch operating cam 427, for example, releasing the relay 419 which in turn releases the relay 323. The shear mechanism automatically completes a one revolution operating cycle. The combination of the relays 417 and 419 and the switch 421 is provided to close the power circuit for the shear actuating solenoid for a sufficient time to assure proper actuation of the shear mechanism.

When the switch 421 is tripped, a circuit is momentarily completed to energize an actuating solenoid 435 for the stepping switch 273 which acts in conjunction with the selector switch 275. The stepping switch 275 comprises two banks of contacts 439 and 441. In the bank 439, all of the contacts except the zero contact are connected to ground and are sequentially engaged by a wiper arm 443. In the bank 341, each of the contacts except for the zero contact is connected to a corresponding contact on the selector switch 275. These contacts are sequentially engaged by a wiper arm 445 which moves in synchronism with the arm 443, both being advanced one contact each time the solenoid 435 is actuated.

Before the shear mechanism completes its one revolution operating cycle, a second switch 451 is tripped by the switch operating cam 427. The closing of this switch provides a power pulse for two circuits, one of which is the stepping switch 271 clearing circuit and the other of which is the work slide advancing circuit. To clear the stepping switch 271, a relay 461 is pulled. This relay receives ground through a switch 463 which is operated by a cam 465 of the stepping switch 271. The switch 463 is held open by the cam 465 when the wiper arm is in the zero position. As soon as the wiper arm moves from the zero position, and through all of the ten positions of the stepping switch 271, the switch 463 is closed. The relay 461 locks itself through its arm A and the switch 463. A solenoid 467 is energized through the arm B of the relay 461. This solenoid releases a latch on the stepping switch 271 wiper arm so that the arm returns to the zero position ready to start a new cycle. When the arm reaches the zero position, the switch 463 is opened releasing the relay 461 which in turn deenergizes solenoid 467.

In the work slide advancing circuit, the momentary closing of the switch 451 completes a circuit through the arm D of the relay 471 and a switch 473 to pull a slow release relay 475. The switch 473 is operated by the magnet slide 91 and is normally closed. The relay 475 is self-locking through its arm A and the switch 473. An arm B of the relay 475 switches to deenergize the magnets 89 of the magnet slide 91 and to energize the holding magnet 95 which holds the work slide 101 fixed relative to the cross slide 81. The power for the magnet energizing circuits is provided through the switch 267. A circuit is provided through the arm C of the relay 475 and the switch 267 to pull a slow operating relay 477 which closes the power circuit for an air valve operating solenoid 479. The slow operating relay provides time for the magnets to energize and deenergize. The solenoid 479 actuates a four-way air valve 481 to one position when it is energized and returns the valve to its original position when it is deenergized.

When the air valve is actuated due to energization of the valve operating solenoid 479, the air is controlled to move the piston of the air cylinder 97, and hence the magnet slide 91, from left to right as indicated in the circuit diagram in Figure 14 or to its rearward position. As soon as the magnet slide begins to move, a switch 483, which has been held open by the magnet slide in its forward position, closes to complete a circuit pulling a relay 485. The pulling of the relay 485 in turns pulls a slow release relay 487. These last-mentioned two relays comprise a cocking circuit for the clutch 33 similar to that of relays 291 and 293 for the stepping switch 271. The cocking circuit of relays 485 and 487 is now cocked awaiting the release of relay 485.

When the magnet slide 91 reaches its rearward position, it engages the switch 473 opening this switch to release the relay 475. The arm 375-B again switches to deenergize the holding magnet 95 and energize the sliding magnets 89. The arm 475-C opens the circuit to the slow operating relay 477 which holds momentarily permitting the magnets 89 time to be energized to full magnetic capacity. The relay 477 then releases opening the power circuit for the air valve operating solenoid 479 to actuate the air valve back to its original position. The air cylinder carries the magnet slide 91 forward, from right to left, and advances the work slide 101 a distance equivalent to the width of a strip to be sheared and which is set by the micrometer screw 94.

When the magnet slide 91 again reaches its forward position, the switch 483 opens releasing the relay 485. While the slow release relay 487 momentarily holds, a circuit is completed through the arms of relays 485 and 487 to pull a relay 489 which completes the power circuit for the clutch actuating solenoid 183. As the clutch rotates 180°, returning the shuttle slide 41 to its original rearward position, the switch 195 is momentarily closed. This completes a circuit through arm C of the relay 471 to pull the relay 291 of the stepping switch cocking circuit. Since this relay 291 is immediately released the stepping switch 271 is stepped to start the succeeding indexing cycle of the three motor circuits 285, 287 and 289.

Last shear operation

When the last shear is made on a circuit board, the tripping of the switch 421 by the shear cam 427 momentarily energizes the stepping switch actuating solenoid 435. The wiper arm 445 is then stepped to the contact in bank 441 which corresponds to the contact which has been selected by the wiper arm 277 of the selector switch 275. When this occurs a circuit is completed through the bank 441 and the selector switch 275 to pull the relay 471. The relay 471 then locks through its own arm A and the arm H of the relay 321. When the shear cam 427 has come around to trip the switch 451, the relay 471 has been pulled so that the circuit through the arm 471–D, instead of completing the circuit to the relay 475 of the work slide control circuit, completely bypasses this circuit since it is not necessary to advance the board for another shear. The circuit instead is completed through the relay arm 471–D to the relay 485 in the cocking circuit for the clutch 33. Since this is a power pulse, the cocking circuit is only cocked momentarily and the clutch is immediately tripped to return the shuttle slide 41 to its original position.

The switch 451 also completes the circuit to pull the relay 461 to return the stepping switch 271 to its zero position in the manner already described.

As a consequence of the pulling of the relay 471 a circuit is completed from the grounded contacts of the bank 439 of the stepping switch 273 through the wiper arm 443, contact arm A of the stepping switch actuating solenoid 435 and the arm B of the relay 471 to energize the solenoid 435. When the solenoid 435 is energized, this circuit is immediately broken at the arm 435–A and simultaneously the wiper arms 443 and 445 of the stepping switch 273 are each advanced one contact. When this circuit is broken, the solenoid 435 is deenergized and the circuit is then remade through the next adjacent contact of the bank 439. This intermittent closing and opening of the circuit will continue until the wiper arms 443 and 445 of the stepping switch 273 have moved around to their respective zero positions to set up the switch for the shearing of the next board.

Circuit clearing operation

After the operation of the limiting circuit for either direction of drive of the motors 47, 73 or 117 or after the completion of a machine cycle for a complete circuit board 11, it is desired to return the motors to their zero positions. This is accomplished through the clearing circuit in conjunction with the zero set cams which have already been described in relation to the limit cams. This function will again be described in relation only to the motor circuit 285.

To operate the clearing circuit, the lever 261 is pushed all the way forward to raise the contact assemblies 200 and 210 from the circuit board and to engage the switch arm 267 with its NO contact. This provides power to pull the relay 321 which receives ground through the clear switch 283 and the start switch 281. When the relay 321 is pulled, it receives power through its arm B and is therefore self-locking. The arms C, D and E of the relay 321 disengage from their NO contacts to take power away from the limit cam switches 319, 319-2 and 319-3 and to apply power to the zero set cam switches 329, 329-2 and 329-3. The arms F, G and H of the relay 321 engage their NC contacts to place ground on each of the ground relays 397, 397-2 and 397-3.

As heretofore described, after the limting circuit has stopped the motor 47, the shorting relay 301 is held through the locking relay 309 which is awaiting manual release. Hence the motor 47 is prevented from further operation until the locking relay 309 is released. The engaging of the switch 267 with its NO contact also provides power to pull the one shot relay 331. The power lead of this one shot relay has a capacitor 333 in series and a resistor 335 connected across the capacitor 333. This resistor-capacitor circuit makes the relay 331 a one shot relay; that is, when power is applied to the capacitor the capacitor charges up and fires through the resistor 335 to momentarily pull the relay 331, after which the circuit remains inoperative. When the relay 331 is pulled, power is momentarily taken away, at the arm 331A, from the locking relay 309 to release this relay. This in turn releases the shorting relay 301 to again set up the motor circuit 285 for normal operation.

As heretofore described, if the net drive of the motor 47 has been in the forward direction, the zero set cam 323 will have been rotated in a clockwise direction and the high surface 325 of the zero set cam 323 is engaging the arm of switch 329 and this switch is closed. If the net drive of the motor 47 has been in the reverse direction, the cam 323 will have been rotated in a counterclockwise direction and the lower surface 327 of the cam will be engaging the arm of the switch 329 and the switch will be open.

Assume now that the net drive of the motor 47 has been in the forward direction, the switch 329 is closed and power is provided through the arm E of the relay 321 and the switch 329 to pull the limit relay 305 which in turn pulls the locking relay 309. Power is then provided through the arms 305B and 309B to pull the motor relay 303. The shorting relay 301 is then pulled through the arm C of the motor relay 303 to set up the shorting circuit as previously described. The motor 47 then drives the cam 323 in a counterclockwise direction until the high surface 325 moves off of the arm of switch 329 at which time the switch is open. When this occurs the limit relay 305 is released taking power away from the motor relay 303 to release this relay. When the motor relay 303 is released, the shorting circuit previously described again takes over and the motor is prevented from further operation. The zero set cam 323 is now in its zero position as is the limit cam 315. The locking relay 309 is again held in and, in turn, holds the shorting relay 301. The locking relay 309 must be released before the circuit can again assume normal operation. This is accomplished by taking away ground either through the clear switch 283 or the start switch 281.

Assume now that the net drive of the motor 47 has been in a reverse direction, in which event the switch 329 is open. Now the motor 47 will drive the zero set cam 323 in a clockwise direction until the shoulder separating the low surface 327 and the high surface 325 engages the arm of switch 329. At this time the limit relay 305 is pulled, in turn pulling locking relay 309 to provide power to pull the motor relay 303 through the relay arms 305B and 309B. The shorting relay 301 is again pulled through the arm C of the motor relay 303 to set up the shorting circuit. The motor 47 then drives the cam 323 in a counterclockwise direction just enough to move the high surface 325 out of engagement with the arm of switch 329. The limit relay 305 then releases taking power away from the motor relay 303. The shorting circuit again prevents the motor 47 from further operation. At this time the zero set cam 323 is again in its zero position as is the limit cam 315. Again the locking relay 309 is held and must be released by removing ground either through the clear switch 283 or the start switch 281.

When the lever 261 is pushed forward to accomplish the clearing operation, the switch 265 is opened which immediately takes ground away from the shear operating circuit and from the stepping switch 271 so that neither of these circuits can operate at this time. The switch 267 is disengaged from its NC contact to take power away from the magent circuit and from the air valve operating circuit to render these circuits inoperative. The magnet slide 91 is then held in its forward position by the air cylinder and the working slide 101 may be pulled back with respect to the magnets for the purpose of removing the remaining portion of the old board and inserting a new board.

The clearing operation also causes the stepping switch 271 to return to its zero position in a manner similar to that described in relation to the normal operation of the shear operating circuit. When the one shot relay 331 is momentarily pulled ground is provided through its arm B to energize the solenoid 467. This returns the wiper arm of the stepping switch 271 to its zero position.

In the event that the shuttle slide is in its forward position at the time the circuit is cleared, it is desired to return the slide to its rearward position before normal operation of the circuit is resumed. When the one shot relay 331 is pulled, power is provided through its arm A to pull the cocking relay 485 in the clutch operating circuit. Since this is a momentarily power pulse, the clutch is immediately tripped to return the shuttle slide 41 to its original rearward position.

An additional function of the clearing circuit is to return the stepping switch 273 to its zero position. This is accomplished in the same manner as that described for the operation of the stepping switch 273 after the last shear. In that operation a circuit was completed between the grounded contacts of the bank 439 of the stepping switch 273 and the actuating solenoid 435 of the stepping switch through the arm B of relay 471. This circuit set up an intermittent operation of the solenoid 435 which stepped the wiper arms 443 and 445 of the stepping switch 273 until they returned to the zero position. This same circuit is now completed through the arm A of relay 321 instead of the arm B of relay 471 to reset the stepping switch 273 to its zero position.

To complete the clearing of the circuit, the clear switch 283 should now be opened to release the locking relay 309. However, this relay is released when the start switch 281 is again depressed at the beginning of a new machine cycle.

The complete machine circuit has now been cleared so that the circuit will again operate in a normal manner when the start switch 281 is depressed to engage its NO contact.

What is claimed is:

1. Apparatus for feeding and indexing a sheet to predetermined positions for successive fabrication operations on said sheet, said positions being determined by conductive index marks on said sheet aligned in the direction of feed of said sheet, said apparatus comprising a plurality of fixed contacts mounted for engagement with said index marks, means comprising a pair of clamps for holding said sheet in said apparatus, a multiple slide mechanism for successively and independently driving said sheet in reciprocating longitudinal, transverse and rotational movements with respect to the direction of feed of said sheet, circuit means operatively connected with said contacts and controlled by said index marks for controlling said independent movements of said slide mechanism, means controlled by said circuit means for actuating a fabrication mechanism, means controlled by said circuit means responsive to the actuation of said fabrication mechanism for advancing said sheet to position a second index mark adjacent said contacts, and means controlled by said circuit means responsive to said advancing of said sheet for driving said slide mechanism.

2. Apparatus for feeding and indexing a sheet to predetermined positions for successive fabrication operations on said sheet, said positions being determined by conductive index marks on said sheet aligned along the edges of said sheet in the direction of feed, a pair of index marks being provided for each position of said sheet, said apparatus comprising a plurality of fixed contacts mounted for engagement with said index marks, means for clamping said sheet in said apparatus, a multiple slide mechanism for successively indexing said sheet longitudinally, transversely and rotationally with respect to the direction of feed of said sheet, a plurality of reversible motors operatively connected with said contacts and controlled by said index marks for driving said multiple slide mechanism, a control circuit, means controlled by said circuit for advancing said multiple slide mechanism to position said sheet for said first fabrication operation, means controlled by said circuit for actuating a fabrication mechanism, means controlled by said circuit for advancing said sheet clamping means to position said sheet for a second operation, and means controlled by said circuit for withdrawing said multiple slide mechanism wherein a second pair of index marks is positioned adjacent said contacts.

3. Apparatus for feeding and indexing a sheet to predetermined positions for successive shearing operations on said sheet, said positions being determined by conductive index marks on said sheet aligned along edges of said sheet parallel to the direction of feed, a pair of said index marks being provided for each position of said sheet to fix a line of shear, said apparatus comprising a plurality of fixed contacts mounted for engagement with said index marks, means for clamping said sheet in said apparatus, a multiple slide mechanism for successively moving said sheet longitudinally and rotationally with respect to the direction of feed of said sheet, means for reciprocating individual slides of said slide mechanism circuit means operatively connected with said contacts and controlled by said index marks for controlling said reciprocating means, one of said contacts being engaged by one of said pair of index marks to control the positioning of said sheet longitudinally, another of said contacts being engaged by the other of said pair of index marks to control the positioning of said sheet rotationally, means controlled by said circuit means for actuating said shear, and means controlled by said circuit means for advancing said sheet clamping means to position a second pair of index marks adjacent said contacts.

4. Apparatus for feeding and indexing a sheet to successive predetermined positions for repetitive operations by a fabrication mechanism, said sheet being provided with a pair of conductive index marks for each predetermined position of said sheet, said index marks providing two accurately defined working edges disposed perpendicular to the direction of feed and one accurately defined working edge disposed parallel to the direction of feed; said apparatus comprising a plurality of fixed contacts mounted for engagement with said index marks, a work slide having a pair of clamps for holding said sheet, one of said clamps being fixed to said work slide, the other of said clamps being movable with respect to said work slide in the direction of feed, means for positioning said work slide whereby a first pair of index marks is positioned adjacent said contacts, a transverse slide, said work slide being slidably supported for movement in the direction of feed on said transverse slide, means for feeding said work slide forward with respect to said transverse slide in successive steps, a mechanism for successively moving said sheet longitudinally, transversely and rotationally with respect to the direction of feed of said sheet, said mechanism comprising said movable clamp, said transverse slide, a longitudinal slide and a shuttle slide, a motor mounted on said work slide for reciprocating said movable clamp in the direction of feed, said transverse slide being slidably supported for movement perpendicular to the direction of feed on said longitudinal slide, a motor mounted on said longitudinal slide for reciprocating said transverse slide with respect to said longitudinal slide, said longitudinal slide being slidably supported for movement in the direction of feed on said shuttle slide, a motor mounted on said shuttle slide for reciprocating said longitudinal slide with respect to said shuttle slide, an operating circuit for each of said motors, means connecting each operating circuit with one of said contacts whereby said circuit is controlled by one of said index marks, means for successively energizing said operating circuits whereby said motors function sequentially to accurately index said sheet with respect to said contacts, means responsive to said indexing operation for moving said shuttle slide to a forward position to position said sheet in said fabrication mechanism, means responsive to said positioning of said shuttle slide for actuating said fabrication mechanism, means responsive to the operation of said fabrication mechanism for feeding said work slide one step to advance said sheet to its next predetermined position, means responsive to said feeding of said work slide for returning said shuttle slide to its rearward position to position a second pair of index marks adjacent said contacts, and means responsive to said last named positioning to again energize said motor operating circuits for successive operation.

5. In an apparatus for indexing a sheet in a fabrication mechanism, said apparatus including a slide assembly having individual slides for positioning said sheet longitudinally, transversely and rotationally, a control circuit, a plurality of fixed contacts mounted for engagement with conductive index marks on said sheet and operatively connected in said circuit, a plurality of reversible motors operatively connected in said circuit and operatively coupled to said slides of slide assembly, each of said motors being controlled by one of said contacts in cooperation with one of said index marks, each of said motors driving one slide in one direction when its associated contact is not engaged with an associated index mark and driving in a reverse direction when its associated contact is engaged with an associated index mark, switch means for sequentially energizing said contact controls for said motors, means for stopping the drive of each motor when its respective contact disengages from its respective index mark, means controlled by said switch means for actuating said fabrication mechanism, means for limiting the amount of drive of each of said motors in either direction, and means preventing further operation of said control circuit when a motor drive limit is reached.

6. In an apparatus for indexing a sheet having individual slide mechanisms for positioning said sheet longitudinally, transversely and rotationally, a reversible motor operatively coupled to each of said mechanisms, a control circuit comprising individual motor circuits for controlling the operation of said motors, a plurality of fixed contacts positioned for engagement by conductive index marks provided on said sheet, one of said contacts being operatively connected to each of said motor circuits, a step switch connected to said motor circuits for energizing said motor circuits in a fixed sequence repetitively, each of said motor circuits driving its respective motor in one direction when its associated contact is not engaged with an index mark and in a reverse direction when its associated contact is engaged with an index mark, each of said motor circuits causing its respective motor to stop while driving in a reverse direction when its associated contact disengages from its index mark, and means in each motor circuit responsive to said stopping of a motor for actuating said step switch.

7. Apparatus for feeding and indexing a sheet to predetermined positions for successive fabrication operations on said sheet, said positions being determined by pairs of conductive index marks on said sheet aligned in the direction of feed of said sheet, said apparatus comprising a plurality of fixed contacts mounted for engagement with said index marks, means for clamping said sheet in said apparatus, means for positioning a first pair of index marks adjacent said contacts, a mechanism comprising individual slides for indexing said sheet longitudinally, transversely and rotationally, drive means for reciprocating each of said slides, a control circuit operatively connected to said contacts and controlled by said index marks to actuate said drive means, a shuttle mechanism for carrying said indexed sheet into and out of a fabrication mechanism, means responsive to said indexing of said sheet for advancing said shuttle mechanism, means responsive to said advancing of said shuttle mechanism for actuating a fabrication mechanism, means responsive to said fabrication mechanism for advancing said sheet clamping means to position said sheet for a second indexing operation, means responsive to said advancing means for withdrawing said shuttle mechanism whereby a second pair of index marks is positioned adjacent said contacts, means for counting the number of fabrication operations performed on said sheet, and means responsive to said counting means for rendering said sheet advancing means inoperative after a last fabrication operation and for withdrawing said shuttle mechanism.

8. Apparatus for feeding and indexing a sheet to predetermined positions for successive fabrication operations on said sheet, said positions being determined by conductive index marks on said sheet aligned in the direction of feed of said sheet, a pair of index marks being provided for each position of said sheet, said apparatus comprising a plurality of fixed contacts mounted for engagement with said index marks, means for clamping said sheet in said apparatus, means for positioning a first pair of index marks adjacent said contacts, a multiple slide mechanism for successively indexing said sheet longitudinally, transversely and rotationally with respect to the direction of feed of said sheet, reversible motors operatively coupled to individual slides of said slide mechanism, each indexing operation being performed individually by one of said motors, a control circuit operatively connected to said contacts and controlled by said index marks to operate said motors, means controlled by said circuit for advancing said multiple slide mechanism to position said sheet for said first fabrication operation, means controlled by said circuit for actuating a fabrication mechanism, means controlled by said circuit for advancing said sheet clamping means to position said sheet for a second indexing operation, means controlled by said circuit for withdrawing said multiple slide mechanism to position a second pair of index marks adjacent said contacts, means for counting the number of fabrication operations performed on said sheet, and means controlled by said counting means for causing said sheet advancing means to be inoperative after a last fabrication operation, said last named means causing the immediate withdrawal of said multiple slide mechanism.

9. A method for indexing a sheet for repetitive fabrication operations at predetermined positions on said sheet, said method comprising providing a pair of conductive index marks for each operation position of said sheet, said marks defining three accurately defined contact edges, providing three fixed contacts having accurately defined contact areas in predetermined space relation to a fabrication mechanism, positioning said contacts to be engaged by said index marks, feeding said sheet to place a first pair of index marks adjacent said contacts, driving said sheet successively and independently in reciprocating movements which are longitudinal, transverse and rotational with respect to the direction of feed, controlling said movements by electrical circuit means which are successively energized, each of said movements being controlled by one of said contacts in cooperation with one of said index marks, each of said movements being controlled in one direction when its associated index mark is not engaged with its associated contact and in a reverse direction when its associated index mark is engaged with its associated contact, arresting each of said movements in a reverse direction through disengagement of an index mark with an associated contact, and deenergizing one control circuit and energizing a successive control circuit through said disengagement.

References Cited in the file of this patent

UNITED STATES PATENTS

| | | |
|---|---|---|
| 1,149,018 | Beregh | Aug. 3, 1915 |
| 1,827,349 | Bing | Oct. 13, 1931 |
| 1,991,423 | Shaver | Feb. 19, 1935 |
| 2,178,304 | Holness | Oct. 31, 1939 |
| 2,551,364 | Coakley | May 1, 1951 |
| 2,607,421 | Anderson | Aug. 16, 1952 |